US012068654B2

United States Patent
Ruppert

(10) Patent No.: US 12,068,654 B2
(45) Date of Patent: Aug. 20, 2024

(54) STATOR FOR AN ELECTRIC MACHINE

(71) Applicant: Schaeffler Technologies AG & Co. KG, Herzogenaurach (DE)

(72) Inventor: Andreas Ruppert, Bühlertal (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 409 days.

(21) Appl. No.: 17/429,098

(22) PCT Filed: Jan. 10, 2020

(86) PCT No.: PCT/DE2020/100015
§ 371 (c)(1),
(2) Date: Aug. 6, 2021

(87) PCT Pub. No.: WO2020/160727
PCT Pub. Date: Aug. 13, 2020

(65) Prior Publication Data
US 2022/0052575 A1 Feb. 17, 2022

(30) Foreign Application Priority Data
Feb. 8, 2019 (DE) ...................... 10 2019 103 191.5

(51) Int. Cl.
*H02K 3/50* (2006.01)
(52) U.S. Cl.
CPC ........... *H02K 3/50* (2013.01); *H02K 2203/09* (2013.01)
(58) Field of Classification Search
CPC .............................. H02K 3/50; H02K 2203/09
See application file for complete search history.

(56) References Cited

U.S. PATENT DOCUMENTS

| | | | |
|---|---|---|---|
| 2014/0232223 A1 | 8/2014 | Takasaki | |
| 2015/0097453 A1 | 4/2015 | Nishikawa et al. | |
| 2015/0280507 A1* | 10/2015 | Kayano | H02K 9/19 310/71 |
| 2016/0308426 A1* | 10/2016 | Ciampolini | H02K 3/50 |
| 2018/0040392 A1 | 2/2018 | Fujiwara et al. | |
| 2018/0241272 A1* | 8/2018 | Asahi | H02K 15/0068 |
| 2018/0309337 A1 | 10/2018 | Lee et al. | |
| 2020/0106319 A1* | 4/2020 | Tategata | H02K 3/50 |
| 2022/0263370 A1* | 8/2022 | Ruppert | H02K 3/50 |

(Continued)

FOREIGN PATENT DOCUMENTS

| | | |
|---|---|---|
| CN | 102340193 A | 2/2012 |
| CN | 105099036 A | 11/2015 |
| CN | 105703515 A | 6/2016 |

(Continued)

*Primary Examiner* — Forrest M Phillips
(74) *Attorney, Agent, or Firm* — Volpe Koenig

(57) ABSTRACT

A stator for an electric machine is provided having a winding with plurality of interconnected conductors assigned to one or more phases. The ends of at least some of the conductors protrude axially or radially beyond the winding at the inner circumference or at the outer circumference of the winding, wherein an interconnection ring, to which the conductors are connected, is positioned axially or radially on the winding. The ends of in each case at least two conductors assigned to one phase protrude radially or axially outwards and are connected to a power connection arranged radially outside the winding.

8 Claims, 3 Drawing Sheets

(56) References Cited

U.S. PATENT DOCUMENTS

2022/0360131 A1* 11/2022 Ruppert ................ H02K 5/225

FOREIGN PATENT DOCUMENTS

| | | |
|---|---|---|
| CN | 106571709 A | 4/2017 |
| CN | 107534357 A | 1/2018 |
| DE | 102012020329 A1 | 4/2014 |
| JP | 2012143019 A | 7/2012 |
| WO | 2014011811 A1 | 1/2014 |
| WO | 2014061276 A1 | 4/2014 |
| WO | 2018038246 A1 | 3/2018 |

* cited by examiner

STATOR FOR AN ELECTRIC MACHINE

CROSS-REFERENCE TO RELATED APPLICATIONS

This application is the U.S. National Phase of PCT Appln. No. PCT/DE2020/100015 filed Jan. 10, 2020, which claims priority to DE 102019103191.5 filed Feb. 8, 2019, the entire disclosures of which are incorporated by reference herein.

TECHNICAL FIELD

The disclosure relates to a stator for an electric machine, having a winding comprising a plurality of interconnected conductors assigned to one or more phases.

BACKGROUND

Electric machines comprising a rotor and a stator are used in different areas of application. The use of electric machines for electric hybrid vehicles and electric vehicles, or for hub drives is to be mentioned only as an example. If such an electric machine is used as a drive machine, it is usually designed as an internal rotor, i.e., the stator surrounds the internal rotor. A moving magnetic field is generated via the stator, which causes the rotor to rotate. For this purpose, the stator has a winding consisting of a large number of conductors, wherein the conductors are assigned to one or usually more than phase.

Not only the number of phases is included in the design of the winding geometry, but also the number of wires per phase as well as the number of wires per slot within the stator toothing and the number of pole pairs. This variety of conductors and winding parameters creates a complex network of conductors that is built up using different winding technologies. Examples include hairpin or bar wave windings. Here, the conductors are formed by means of rods bent into a U-shape, which are put together to form a winding cage. The conductors are laid on a plurality of radial levels, with the conductors moving from level to level, so to speak. To form these meandering, circumferential conductors, they are to be connected accordingly at their ends, which is usually done by welding the conductor ends that are adjacent to one another. The conductor ends converge at one point or on one winding side in the form of the so-called star, where they are connected to one another. In this area, the connection of the individual phases to an external power supply, which is used to generate the magnetic field, must be made, which is often very difficult to implement for reasons of installation space.

SUMMARY

The disclosure is therefore based on the problem of specifying a stator that is as compact as possible.

To solve this problem, in a stator of the type mentioned, the disclosure provides that the ends of at least some of the conductors protrude axially or radially beyond the winding at the inner circumference and/or at the outer circumference of the winding, wherein an interconnection ring, to which the conductors are connected, is positioned axially or radially on the winding, and wherein the ends of in each case at least two conductors assigned to one phase protrude radially or axially outwards and are connected to a power connection arranged radially outside the winding.

According to the disclosure, it is provided that the actual conductor connection, i.e., the connection of the individual conductors to form the corresponding phase-specific meander structures, and the connection for coupling to the power supply are separated via a high-voltage terminal, where the interconnection is provided almost radially on the inside and the connection to the power supply is provided radially on the outside. An interconnection ring is used for the actual conductor connection, i.e., a conductor ring that is placed separately on the winding and that, according to the disclosure, is placed axially or radially on the winding. This interconnection ring engages in the region of axially or radially protruding conductor ends on the inner circumference and/or on the outer circumference of the winding, for example when placed axially between the conductor ends protruding axially over the winding in the area of the inner and outer circumference of the winding. The conductor ends are assigned to the individual conductor sections, unless they are connected to one another on other, for example further inward, radial planes. The conductor ends are connected to the interconnection ring, usually welded to it accordingly, so that the corresponding phase-specific conductor structures or conductor connections are generated via the interconnection ring.

To connect the winding to the actual power connection, according to the disclosure, corresponding conductor ends that are assigned to a phase are guided protruding radially or axially outward. A power connection arranged radially next to the winding head can now be connected accordingly to these conductor ends led radially or axially outward, so that the HV power connection or the individual phase-related terminals can be connected to the corresponding phase-specific conductor ends, of course, can also be welded here.

The almost nested, for example axial and radial arrangement of the interconnection ring and power supply terminal results in a very compact, space-saving structure. In addition, the assembly is also simplified, since the conductors or wires to be connected via the interconnection ring only have to be cut to length and brought into the appropriate position when the winding cage is plugged together in order to be connected to the corresponding connection terminals of the interconnection ring, which are of course positioned accordingly. Both the cutting to length and, of course, the assembly can take place in an automated assembly process, as can of course also be compensated for due to the simple connection of conductor ends and interconnection ring. This is not least due to the fact that the connection ring and the power supply or the HV terminal are two separate assemblies that are connected in different process steps to the stator and then also to the finished electric machine.

The interconnection ring expediently has a plurality of separate line bridges to which the ends of the conductors are connected. These line bridges, which are correspondingly stable metal sheets, which are geometrically shaped so that they reach the corresponding conductor ends to be connected, are grouped into the corresponding circuit ring and allow easy bridging of corresponding distances both in the circumferential and radial direction. These line bridges, like the individual conductors, are of course isolated from one another.

For a simple connection of the line bridges with the corresponding conductor ends, the line bridges expediently have radially or axially protruding connection sections to which the ends of the conductors are welded, which, because they protrude axially or radially from the winding, come to lie next to the connection sections in the assembly position. The connection ring is therefore designed as a star distributor, comprising the corresponding line bridges and the associated, radially or axially protruding connection sections.

To enable the tightest possible packing, the bridges themselves are arranged radially and axially offset from one another and are nested as closely as possible, with the geometry of the individual cable bridges always having to take into account the winding geometry, which is the position of the conductor ends to be connected both on the inside—as well as defined on the outer circumference.

For easy handling, the interconnection ring expediently has a housing in which the bridges are arranged, wherein the preferably radially closed housing has corresponding lateral openings through which the connection sections protrude. The interconnection ring is consequently designed as a fully assembled unit and as such can be placed axially on or radially on the winding head and placed in relation to the conductor ends, for example between the protruding conductor ends. With the insertion, the corresponding connection sections are also positioned exactly with respect to the conductor ends that are to be connected to them, so that then only the welding has to take place.

As described, the power connection or the connections of the HV terminal are arranged radially outside of the stator or the stator head. The two or more conductor ends belonging to a phase, which are to be connected to the HV terminal, are guided radially or axially outwards, i.e., in the case of a radial arrangement, for example, easily bent outwards. This is easily possible with conductor ends on the outer circumference of the winding, since they are located radially outside the interconnection ring. In the case of conductor ends that are on the inner circumference, the ends are preferably guided radially over the interconnection ring, i.e., the interconnection ring is first inserted and connected during assembly, after which the conductor ends on the inner circumference, if there are any, radially outwards be bent so that they overlap the interconnection ring.

The power connection itself expediently has corresponding busbars, which are preferably also accommodated in a housing that is arranged radially laterally next to the stator or the winding head and from which the corresponding connection ends of the busbars protrude. The line ends preferably overlap the busbars so that simple welding can also take place here due to the overlap.

In addition to the stator itself, the disclosure also relates to an electric machine comprising a stator of the type described.

BRIEF DESCRIPTION OF THE DRAWINGS

The disclosure is explained below on the basis of exemplary embodiments with reference to the drawings. The drawings are schematic representations, wherein.

DETAILED DESCRIPTION

Figure 1:
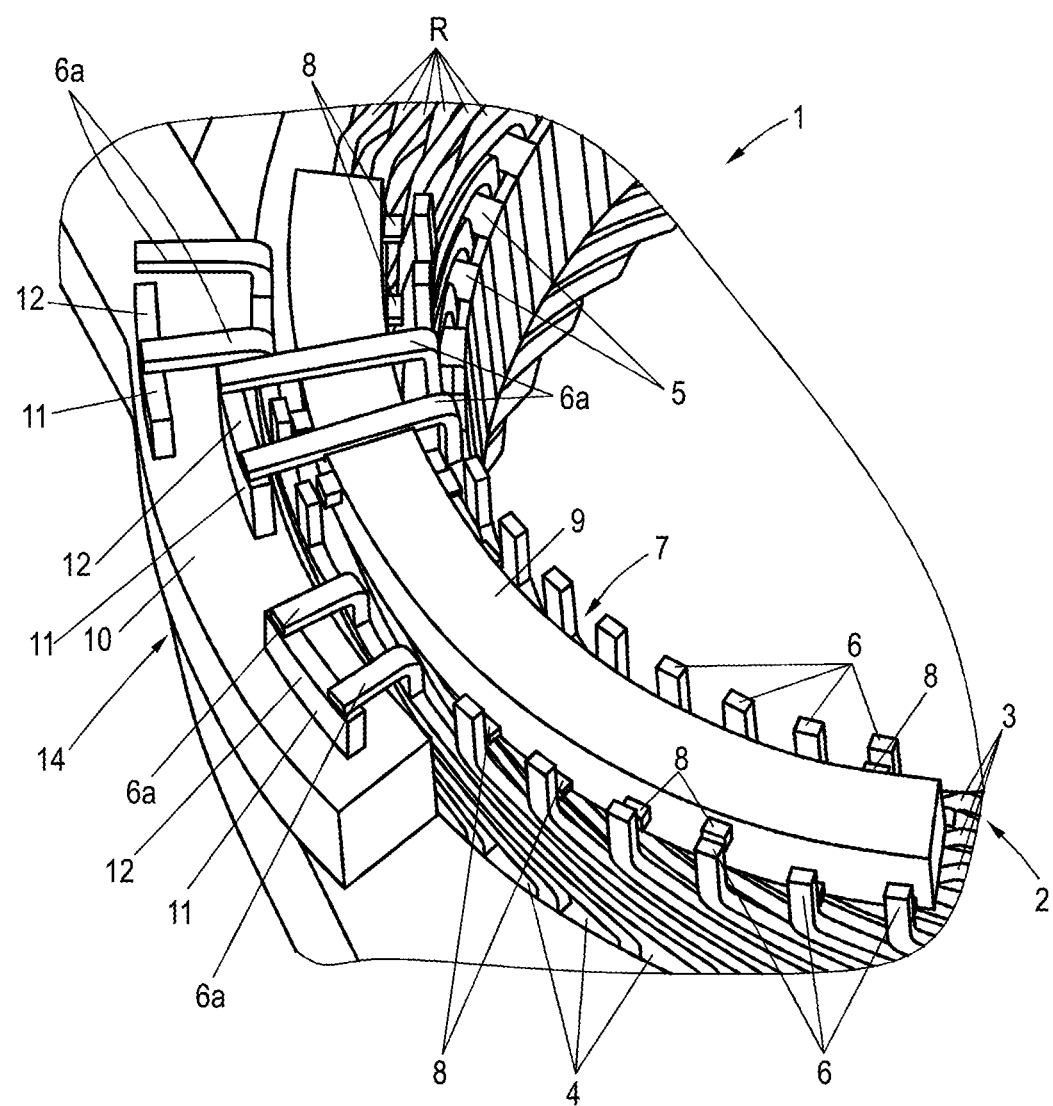
FIG. 1 shows a schematic diagram in the form of a partial view of a stator according to the disclosure.

FIG. 1 shows, in the form of a partial view, a schematic illustration of a stator 1 according to the disclosure of an electric machine, having a winding 2 comprising a plurality of conductors 3, which are assigned to three separate phases in the example shown. Each conductor 3 is designed almost like a U-shaped bracket, wherein a plurality of such U-shaped conductors, often also called hairpins, are plugged together to form the winding 2, which can also be referred to as a winding cage. The plurality of conductors 3 define different radial planes R, as shown in FIG. 1. For this purpose, the conductors 3 extend, depending on the winding diagram, from one radial plane to another radial plane, for example an adjacent radial plane, in the region in which they are connected to the conductor ends of corresponding adjacent conductors continuing the phase conductor.

The conductors are guided or bent and laid in such a way that corresponding recesses 4 result, which extend radially so that corresponding stator teeth 5 engage in these recesses 4 or the corresponding conductors are wound between the corresponding grooves of the stator teeth 5. The basic structure of such a stator or a winding 2 wound from the separate brackets described is basically known.

In the stator 1 according to the disclosure, the ends 6 of the conductors 3, insofar as the ends 6 terminate respectively at the inner circumference and the outer circumference of the annular winding 2, are axially protruding, i.e., they protrude axially from the winding 2. These ends are associated with individual conductors, which in turn are assigned to different phases, which is why the conductor ends must be connected according to the routing diagram of the conductor 3. For this purpose, an interconnection ring 7 is used, which is placed axially on the end face of the winding 2 and is arranged between the conductor ends 6 or engages therebetween. The interconnection ring 7 comprises, as will be discussed below, a plurality of corresponding line bridges and connection sections 8, which protrude to the side from the housing 9 of the interconnection ring 7 and are positioned precisely next to the corresponding conductor end 6 after the interconnection ring 7 has been inserted between the conductor ends 6 with which they are to be connected. The connection is made by simple welding so that all conductors 3 are correctly and phase-specifically interconnected when they are connected.

Furthermore, a power supply 14 is provided, which is arranged radially next to the winding 2 in the region of its axial end. This power supply 14, also referred to as a HV terminal, comprises a housing 10, in which corresponding busbars 11 are arranged, which protrude with their connection terminals 12 from the housing.

In the present case, as described, a 3-phase stator is shown, which is why three such connection terminals 12 are also provided in the example shown.

Each connection terminal 12 is to be connected to one phase of the winding 2. This is implemented in a simple manner in that two conductor ends 6a per phase are guided or bent radially outwards, as FIG. 1 clearly shows. The two conductor ends 6a arranged on the outer circumference of the winding 2 are relatively short and can be bent directly outwards, while the two conductor ends 6a arranged on the inner circumference are longer and overlap the interconnection ring 7. They run above the connection terminals 12 so that a simple welded connection for making contact is possible there as well. The connection to the power supply 14 does not take place until the conductors 3 are interconnected via the interconnection ring 7.

Figure 2:
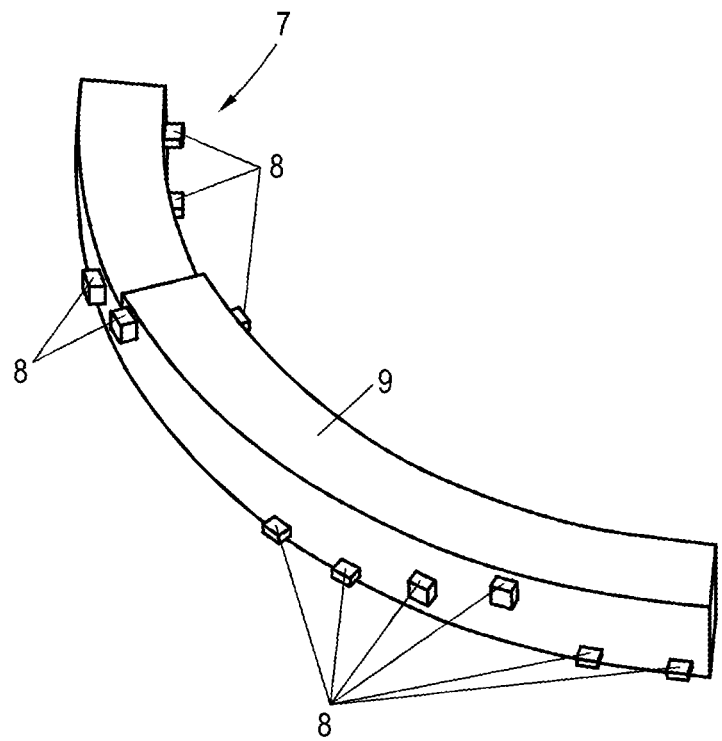
FIG. 2 shows a partial view of the interconnection ring.

FIG. 2 shows a partial view of the interconnection ring 7 according to FIG. 1. The housing 9 is shown, which is accordingly in several parts and also enables radial encapsulation. It can be seen that the corresponding connection sections 8, which are assigned to different phases, protrude from the housing 9 through corresponding openings. As already described, the individual connection sections are assigned to different phases, i.e., connect different conductor ends 6.

Figure 3:
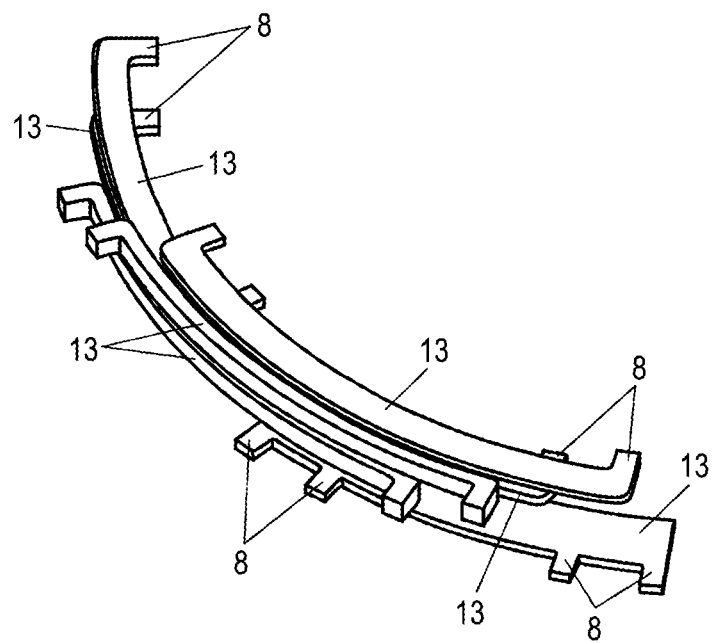
FIG. 3 shows a schematic diagram of various line bridges of the interconnection ring from FIG. 2.

To implement the connection section 8, see FIG. 3, a corresponding plurality of—seven in the example shown—separate line bridges 13 are arranged in the interior of the housing 9, which are arranged axially and radially offset from one another. On the respective inner or outer circumference of the line bridges 13, the corresponding connection sections 8 are formed, which in their entirety form a corresponding star distributor. Corresponding conductor ends arranged offset in the circumferential direction can accordingly be connected accordingly on the inner and outer circumference via the line bridges 13 extending in the circumferential direction so that the corresponding meander structure of the individual phase conductors is formed in this way.

Like the conductors 3, of course, the line bridges 13 are also appropriately insulated or provided with an insulation coating or the like.

Figure 4:
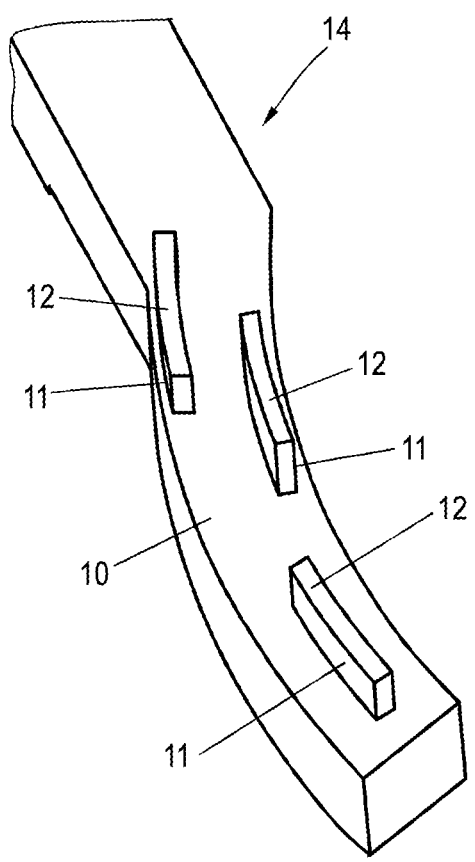
FIG. 4 shows a partial view of the power connection.

Finally, FIG. 4 shows, in an enlarged partial view, the power supply 14, i.e., the HV terminal, with its housing 10, which is also formed from several parts here and completely encapsulates the busbars 11. It is designed to be slightly curved so that it can be placed on the side of the stator to suit its shape. Each busbar 11 or each connection terminal 12 is assigned to a corresponding phase, wherein these phases are usually referred to as U, V and W. Like the housing 9 of the interconnection ring 7, the housing 10 of the power connection 14 also has corresponding openings through which the individual connections protrude.

While the conductor ends protrude axially on the inner and outer circumference in the embodiment shown, it is conceivable to provide conductor ends protruding axially only on the inner or only on the outer circumference. Furthermore, the conductor ends can also protrude radially and be connected to the axially arranged interconnection ring. The interconnection ring can also be attached radially and contacted with the axially or radially protruding conductor ends. Various configurations are therefore possible both with regard to the conductor routing and the positioning of the interconnection ring.

The connection section 8 of the line bridges can finally also protrude axially from the housing 9; an axial and radial arrangement is also conceivable, depending on the configuration of the guidance and positioning of the conductor ends.

LIST OF REFERENCE NUMBERS

1 Stator
2 Winding
3 Conductor
4 Recess
5 Stator tooth
6 Conductor end
6a Conductor end
7 Interconnection ring
8 Connection section
9 Housing
10 Housing
11 Busbar
12 Connection terminal
13 Line bridge
14 Power connection

The invention claimed is:

1. A stator for an electric machine, the stator comprising:
   a winding comprising a plurality of interconnected conductors assigned to one or more phases,
   wherein ends of at least one of the conductors protrude axially or radially beyond the winding at an inner circumference or at an outer circumference of the winding,
   wherein an interconnection ring, to which the conductors are connected, is positioned axially or radially on the winding, the interconnection ring includes a plurality of separate line bridges to which the ends are connected, and the plurality of separate line bridges are arranged radially and axially offset from one another, and
   wherein the ends of in each case at least two conductors assigned to one phase protrude radially or axially outwards and are connected to a power connection arranged radially outside the winding.

2. The stator according to claim 1, wherein the line bridges have radially or axially protruding connection sections to which the ends are connected.

3. The stator according to claim 1, wherein the interconnection ring has a housing in which the line bridges are arranged.

4. The stator according to claim 3, wherein the housing has openings through which the connection sections protrude.

5. The stator according to claim 1, wherein the radially or axially outwardly guided ends of a conductor arranged on the inner circumference overlap the interconnection ring.

6. The stator according to claim 1, wherein the power connection comprises a number of busbars corresponding to the number of phases.

7. The stator according to claim 6, wherein the busbars are accommodated in a housing.

8. An electric machine, comprising a stator according to claim 1.

* * * * *